United States Patent [19]
Carriere

[11] Patent Number: 5,139,300
[45] Date of Patent: Aug. 18, 1992

[54] LINER FOR A VAN OR LIKE VEHICLE

[76] Inventor: Robert W. Carriere, 895 Iroquois Road, Ottawa, Ont., Canada, K2A-3N4

[21] Appl. No.: 668,620

[22] Filed: Mar. 13, 1991

[51] Int. Cl.$^5$ ............................................. B62D 33/00
[52] U.S. Cl. ..................................... 296/39.1; 296/24.1
[58] Field of Search ..................... 296/39.1, 39.2, 24.1, 296/901; 105/423

[56] References Cited

U.S. PATENT DOCUMENTS

| | | | |
|---|---|---|---|
| 3,768,822 | 9/1988 | Gower | 296/39.2 |
| 4,889,377 | 12/1989 | Hughes | 296/24.1 |
| 4,893,867 | 1/1990 | Hilborn et al. | 296/39.1 |
| 4,917,431 | 4/1990 | McDonald | 296/39.1 |
| 4,944,612 | 7/1990 | Abstetar et al. | 296/39.2 |
| 4,991,899 | 2/1991 | Scott | 296/39.2 |

Primary Examiner—Robert R. Song
Attorney, Agent, or Firm—Burke-Robertson

[57] ABSTRACT

There is provided a new and useful liner for a van or the like vehicle, the liner comprising at least one panel member, the panel member comprising a face sheet having a series of grooves therein, each groove having at least one area of discontinuity or of reduced depth therein, at least one area of discontinuity aligned with a similar area in each groove of the series whereby the areas of discontinuity may be secured to a stud located behind the panel member.

18 Claims, 5 Drawing Sheets

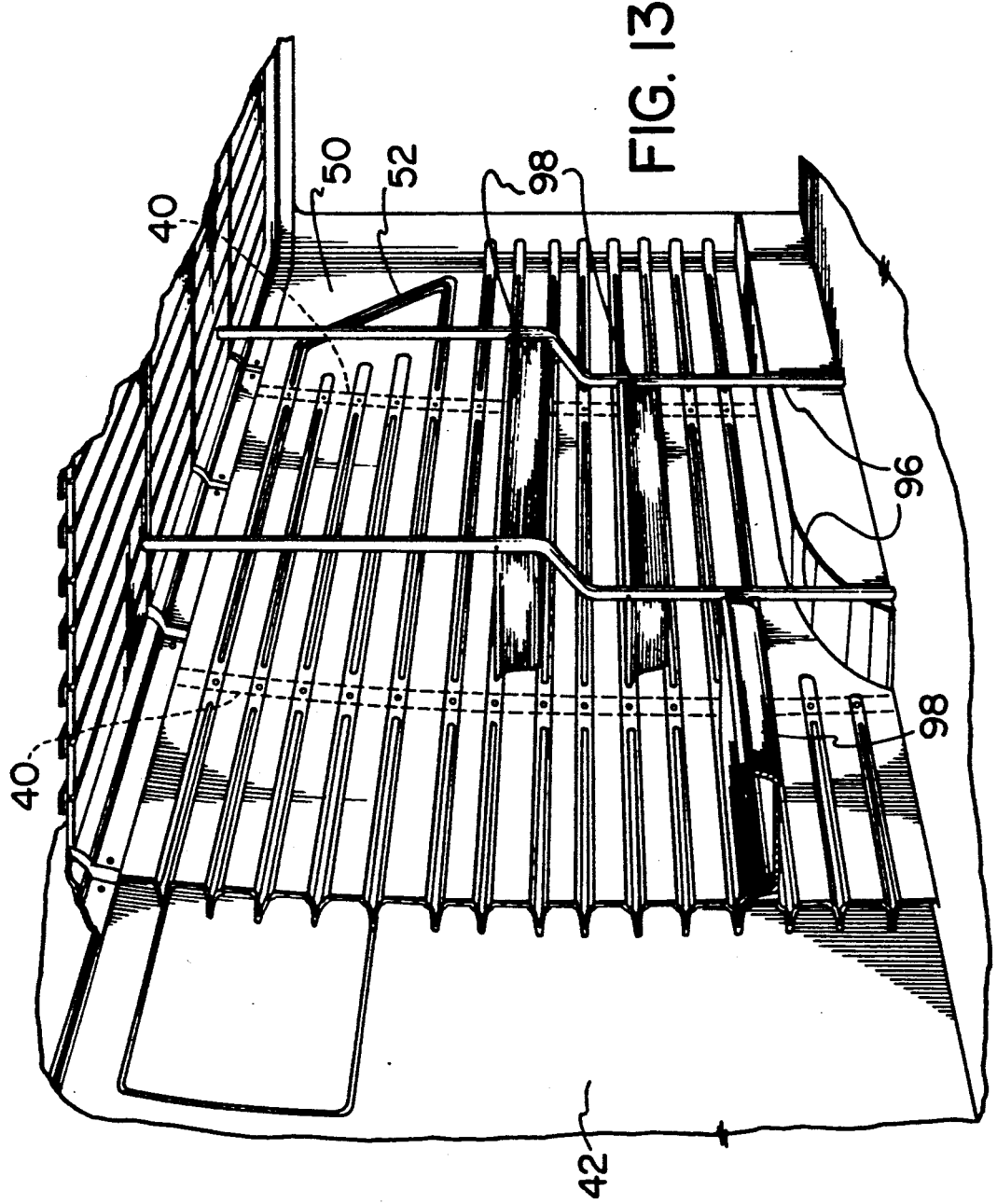

LINER FOR A VAN OR LIKE VEHICLE

FIELD OF THE INVENTION

This invention relates to liners and associated storage bins for commercial vans and the like vehicles.

1. Background of the Invention

There has long been a need in the commercial van industry for more practical liners for the interior of the walls of the cargo area. Generally no liner is included in the standard equipment delivered with a commercial van. Rather, the interior of the van comprises the support studs to which the outer metal skin of the van is attached.

There are various disadvantages to a bare van. For example, the metal skin of the van is in constant danger of being dinged and otherwise defaced by loose or shifting cargo being carried in the van. Other disadvantages are in the poor appearance of the bare interior and in difficulty of temperature control where the outer skin is the only barrier between extremes of heat and cold encountered in many areas.

Liners comprised of plywood have been available from various sources. These have the very substantial disadvantage that they are very heavy, and it is not unusual that a plywood liner will weigh in the five hundred pound range, thus, for example, utilizing half the useful payload of a one-half ton van.

As well, plastic liners in various configurations have been utilized. These in general have the substantial disadvantage that they are not able to maintain a good neat appearance over extremes of temperature. For example, the interior of a van may become very hot in summer and a very serious problem which has resulted from this in respect of plastic liners is that the liners expand and develop a wavy, sagging or otherwise unsightly configuration.

Against this background the present invention provides a plastic liner which addresses the problems noted above and offers advantages over prior art such liners.

2. Prior Art

Applicant is aware of the following U.S. patents which are of peripheral interest but do not offer the features of the present invention:

U.S. Pat. No. 4,247,144, Radek, Jan. 27, 1981.
U.S. Pat. No. 4,504,509, Simeri, et al., March, 1985.
U.S. Pat. No. 4,768,822, Gower, Sep. 6, 1988.
U.S. Pat. No. 4,889,377, Hughes, Dec. 26, 1989.
U.S. Pat. No. 4,893,867, Hilborn, et al., Jan. 16, 1990.
U.S. Pat. No. 4,917,431, McDonald, Apr. 17, 1990.
U.S. Pat. No. 4,944,612, Abstetar, et al., Jul. 31, 1990.
U.S. Pat. No. 4,991,899, Scott, Feb. 12, 1991.

BRIEF SUMMARY OF THE INVENTION

It has now been discovered that a number of problems of the prior art can be alleviated by the use of a plastic liner including panel members having grooves formed into the panel surface. Thus, the invention provides a liner for a van or the like vehicle, the liner comprising at least one panel member, the panel member comprising a face sheet having a series of grooves therein, each groove having at least one area of discontinuity or of reduced depth therein, at least one area of discontinuity aligned with a similar area in each groove of the series whereby the areas of discontinuity may be secured to a stud located behind the panel member.

In a further embodiment the invention provides a liner and a storage kit for a van or like vehicle, the kit comprising a liner comprising at least one panel member, the panel member comprising a face sheet having a series of grooves therein, each groove having at least one area of discontinuity or of reduced depth therein, at least one area of discontinuity aligned with a similar area in each groove of the series whereby the areas of discontinuity may be secured to a stud located behind the panel member; and at least one bin support member for mounting in the van or like vehicle in a position spaced toward the interior of the van or like vehicle from at least one panel member, the support member including means for supporting an outer side of a bin positioned between the support member and the panel member, the inner side of said bin supported by one of said grooves.

BRIEF DESCRIPTION OF THE DRAWINGS

In drawings which illustrate embodiments of the invention,

FIG. 13 is a perspective view of part of a liner and bin installation according to the invention.

Figure 1:
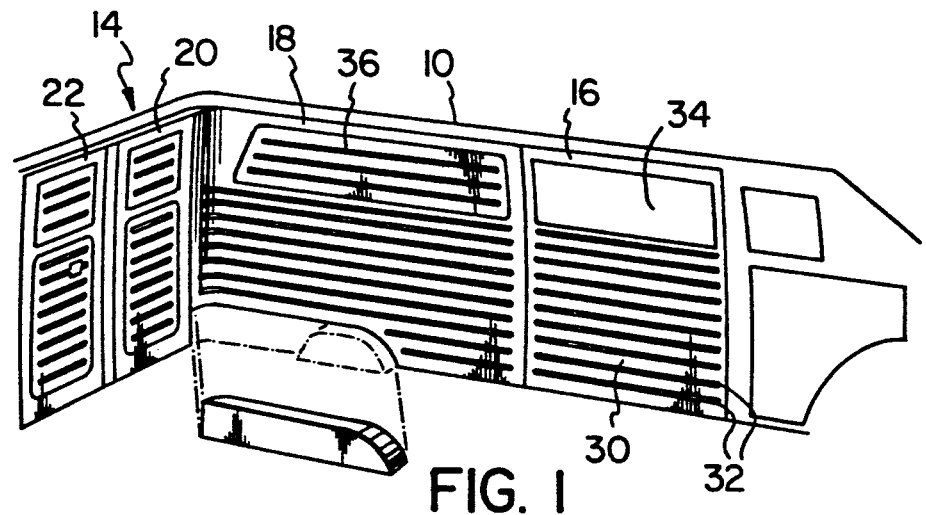
FIG. 1 illustrates one embodiment of a liner according to the invention in place in part of a van.

While the invention will be described in conjunction with illustrated embodiments, it will be understood that it is not intended to limit the invention to such embodiments. On the contrary, it is intended to cover alternatives, modifications and equivalents as may be included within the spirit and scope of the invention as defined by the appended claims.

DETAILED DESCRIPTION OF THE PREFERRED EMBODIMENTS

In the following description, similar features in the drawings have been given similar reference numerals.

Figure 2:
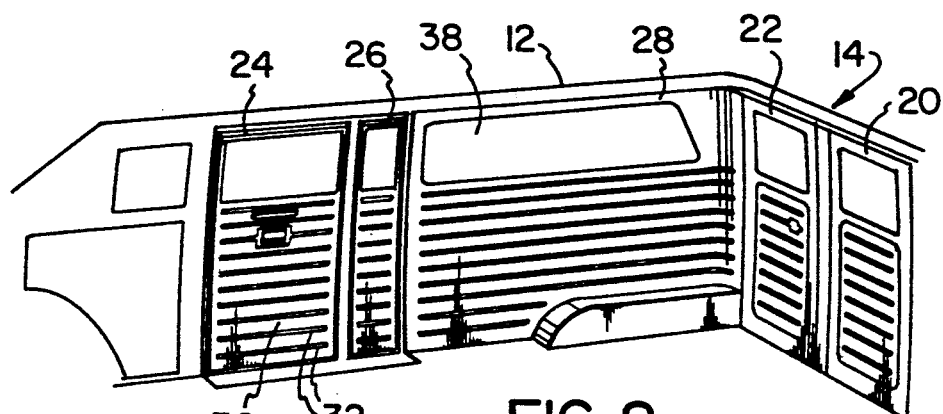
FIG. 2 illustrates a further embodiment of a liner according to the invention in place in a van.

FIGS. 1 and 2 illustrate respectively the left side 10 and right side 12 of a typical van, showing the rear doors 14 in each case.

The left side 10 shows a forward liner panel 16 and a rearward liner panel 18. Liner panels 20 and 22 are shown on the left and right rear doors respectively.

FIG. 2 illustrates the forward panel member 24, central panel member 26 and a rearward panel member 28.

Each of panel members 16 to 28 comprises a face sheet 30 having a series of grooves 32 therein.

Certain of the panels as, for example, left side forward panel 16, are provided with window openings 34. In other cases, as, for example, in left rearward panel member 18, a window blank 36 has been provided. In the preferred form of the invention a kit is provided in which the various panel members include window blanks to conform with possible window configurations of the vans of various manufacturers. Each manufacturer will typically offer vans with a choice of window locations. For example, in some cases a van may have rear door windows but no side windows. Another combination might provide rear door windows and side door windows but no other side windows. In general the available windows will be in standard locations and of standard shape for that manufacturer. For example, if a van buyer requests a rear side window such as window 38 in FIG. 2, that window will always have the same size, shape and location, regardless of what other window choices are made by that buyer. Thus, it is possible to provide a standard set of liner panel members for a given manufacturer's van which panel members will have blanks for the various window sizes, shapes and configurations, such that the required blanks can be removed to match the window configuration of the specific van in which they are installed.

Figure 3:
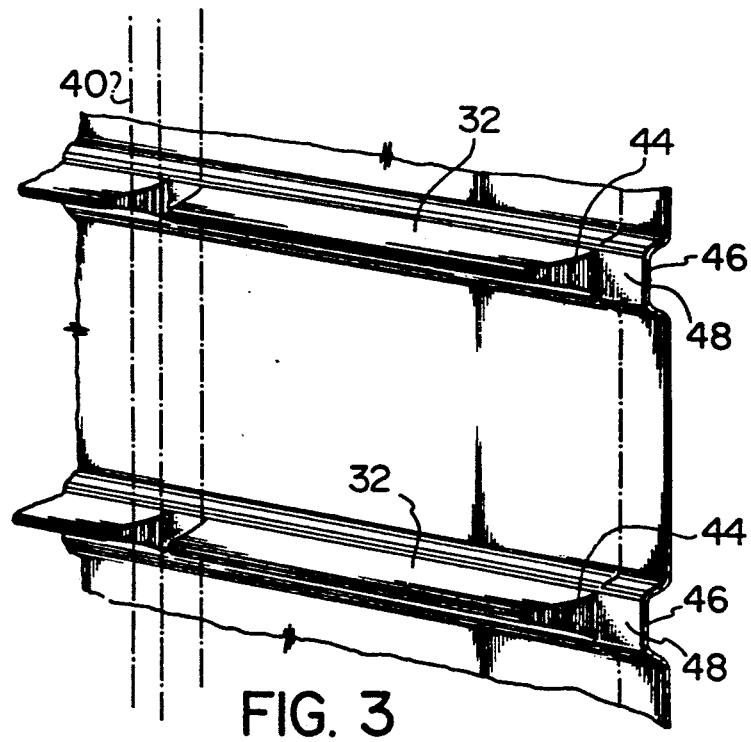
FIG. 3 illustrates detail of construction and installation of a liner according to the invention.
Figure 4:
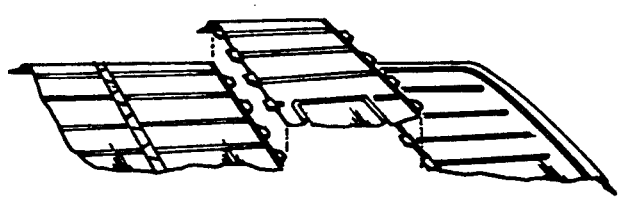
FIG. 4 illustrates roof panels for use with a liner according to the invention.
Figure 5:
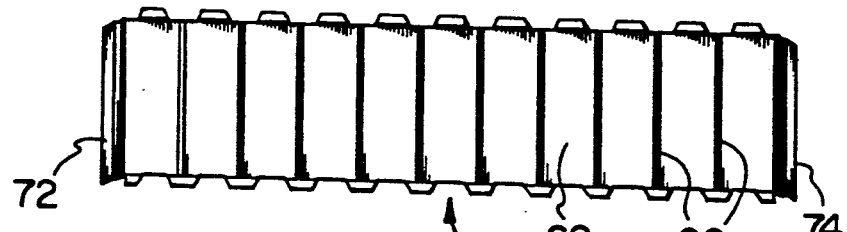
FIG. 5 is a plan view of a roof panel for use with the invention.

Detail of the profile of grooves 32 of panel members 16 to 28 is illustrated in FIG. 3.

Typical van constructions include side walls which comprise a series of spaced studs 40, such as that shown in ghosted lines in FIG. 3, to which the outer metal side walls 42 of the van are secured. The liner panels of the present invention are secured to studs 40.

In order that panel members 16 to 28 can be provided with grooves 32, and still be readily secured to studs 40, it is necessary that the grooves 32 include areas 44 of discontinuity or, preferably, of reduced depth as shown at 46. The areas 48 can then readily be secured to studs 40 with the full grooves 32 extending into the space between face sheet 30 and side wall 42.

The grooves 32 are preferably relatively deep, as illustrated in FIG. 3.

It has been found that the substantial depth of these grooves 32 will contribute markedly to maintaining the rigidity and neat appearance of the panel members 16 to 28 even under very hot summer conditions.

In the much preferred configuration, the window blanks such as blank 36 in rearward side panel 18 of FIG. 1 and, as more readily illustrated, in panel member 50 of FIG. 13, are defined by grooves 52 which are of the same profile as grooves 32. Thus, when a window blank is cut out to suit the window location of a particular installation, the cut will be made down the center of the groove thus leaving one side of the groove to neatly frame the window to provide a professionally finished appearance.

In order to alleviate to some extent the effects of heat and cold in the van cargo area, it is advantageous to insulate the area between the face sheet 30 and the side walls 42. Insulation 54 can be seen in FIG. 14. A common problem with the installation of insulation in the sides of the van is that the insulation tends to compact at the bottom of the side walls due to the vibration and general roughness typical of motor vehicle ride. The present invention substantially removes that problem, because the grooves 32 will serve to prevent insulation bats from sliding down.

Turning to FIGS. 4 to 9, a preferred configuration for liner roof panels is illustrated. The difficulty of holding a roof liner in place while it is being secured has led to difficulties in the past in enabling a single worker to install a liner. In the preferred configuration of the present invention a series of roof panels 56 are utilized to enable easy installation.

Figure 8:
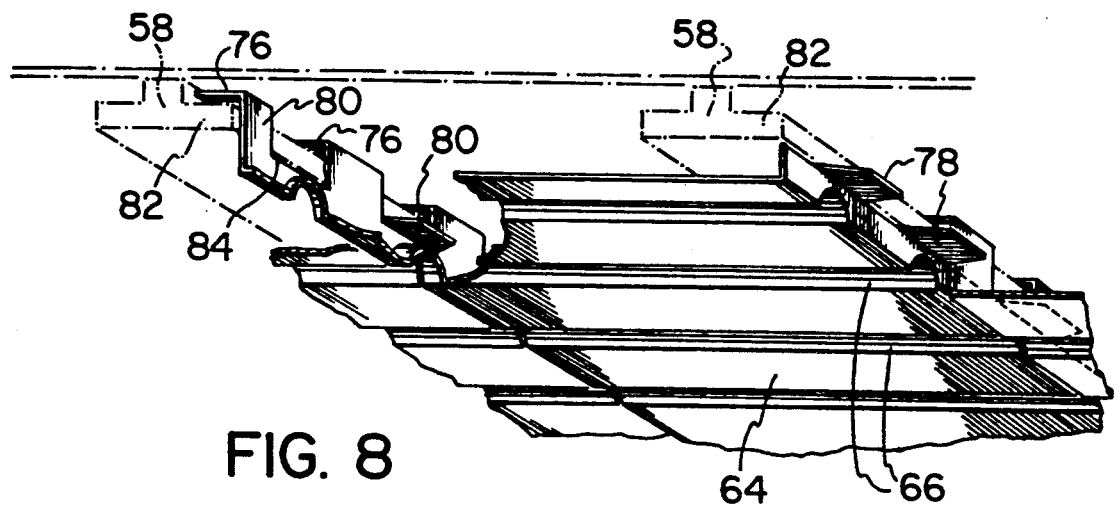
FIG. 8 illustrates the installation of the roof panels of FIG. 6.
Figure 9:
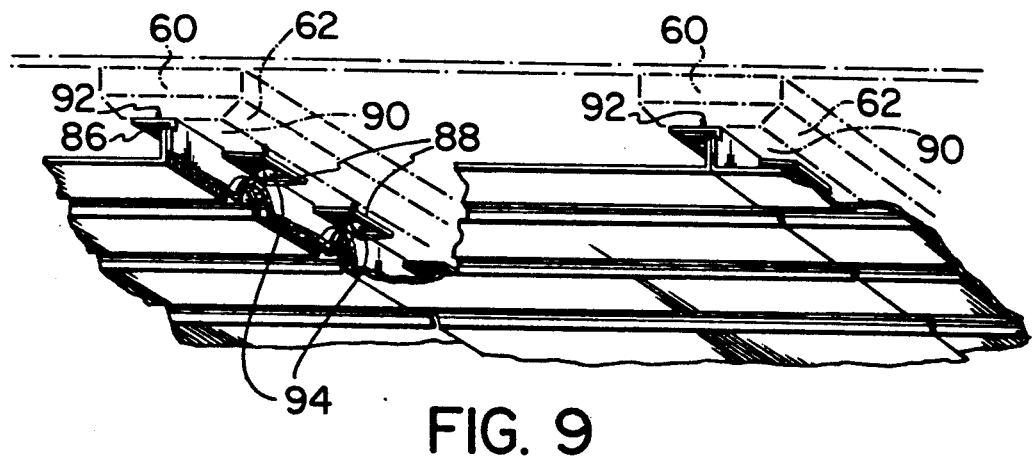
FIG. 9 illustrates installation of the roof panels of FIG. 7.
Figure 10:
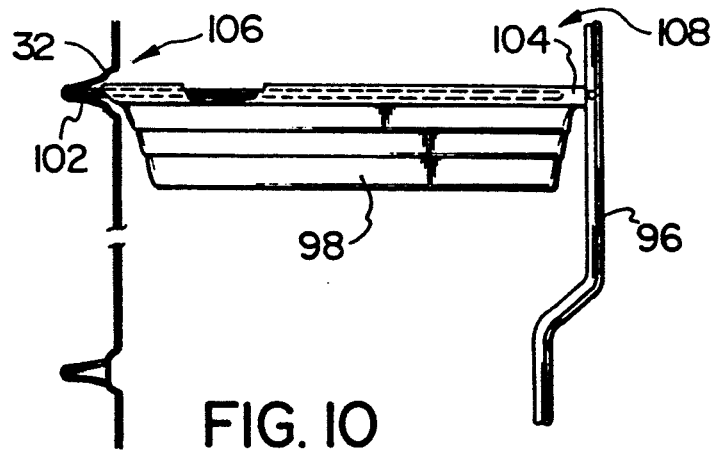
FIG. 10 is a side view of a bin installation for use with the liner of the invention.
Figure 11:
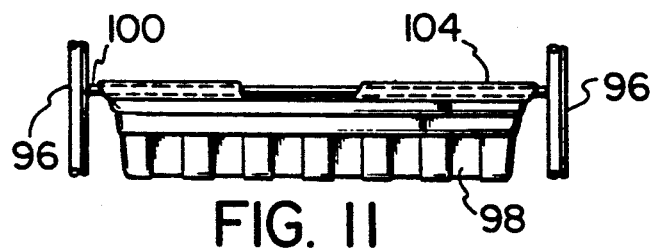
FIG. 11 is a front view of the installation of FIG. 10.
Figure 12:
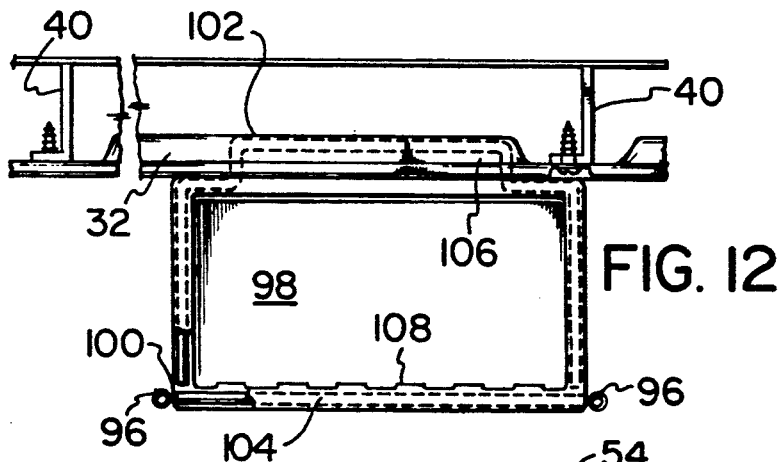
FIG. 12 is a top view of the installation of FIG. 10.

The roof of typical vans is generally reinforced by a series of cross members as shown at 58 in FIG. 8 and 60 in FIG. 9. Different manufacturers utilize different profiles for the cross members. Thus, for example, cross members 58 have inverted T-shaped profile whereas cross members 60 of FIG. 9 have a rectangular profile bevelled at outer edges 62. Thus, variations on a basic liner design are required to conform with the variations in van structure The basic design of the roof panel comprises a sheet section 64 having a series of relatively shallower grooves 66 and end flanges 68 and 70. The side edges 72 and 74 are preferably profiled to fit the curvature of the van walls to provide a neat finished appearance in co-operation with the liner side panel members.

Roof panels 56 are preferably provided with alternating series of tabs extending from the end flanges 68 and 70.

Figure 6:
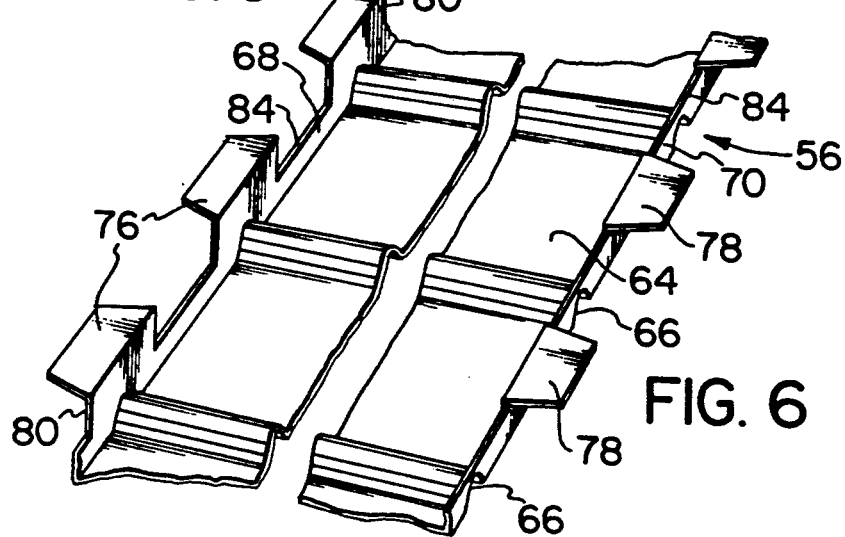
FIG. 6 is a perspective of a roof panel for use with the invention.

With reference to FIG. 6, tabs 76 are provided on one end of panel 56 and tabs 78 are provided on the opposite end.

The tabs 76 are raised by the extensions 80 of flange 68 to a level above the top of flange 68. Tabs 78 are not similarly raised, but simply sit on the top of end flange 70.

The FIG. 6 configuration is for use with the specific configuration of cross members 58 in FIG. 8. Thus, with reference to FIG. 8 the raised tabs 76 can be hooked over the bar 82 of the inverted T-shaped cross member 58. The tabs 78, which are arranged in lateral positions which alternate with tabs 76 on roof panel 56 can then be fitted onto the top 84 of an end flange of an adjacent panel 56. The tabs 76 of the adjacent panel are similarly hooked over bar 82 of a T-shaped cross member to thus retain the first panel 56 in position In order to increase stability and decrease noise, the tabs 78 may, if desired, be secured to bar 82 by screws or other convenient fasteners.

It is evident that the roof can thus be very quickly assembled by a single worker.

Figure 7:
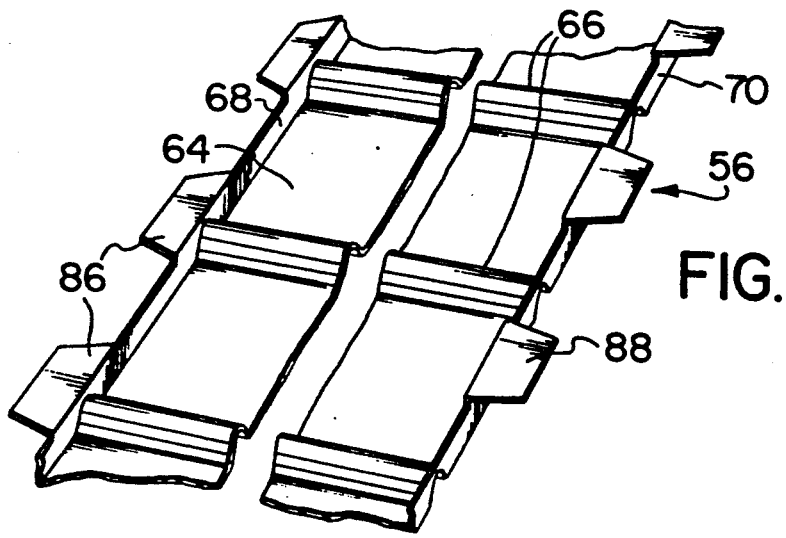
FIG. 7 is a perspective of a roof panel for use with the invention.

The FIG. 7 configuration is illustrated in position in a van in FIG. 9.

The FIG. 7 embodiment either omits or substantially decreases any extension of end flanges 68 under tab 86. Thus, tab 86 is at the same level as or only slightly higher than tabs 88.

The FIG. 7 embodiment, as illustrated in FIG. 9, has the tabs 86 fastened to the outer surface 90 of cross member 60 by screws 92. The tabs 88 of one panel 56 can then be fitted between the secured tabs 86 of an adjacent panel. If desired for stability or noise reduction, the tabs 88 can be secured to the cross member 60 by screws 94. Again, it is evident that the ceiling can be readily assembled by a single worker.

Another important feature of a preferred form of the invention is illustrated in FIGS. 10 to 14.

Bin support members 96, preferably arranged in pairs, are secured in place at desired locations within the van cargo space as shown in FIG. 13. Support members 96 can be secured at ceiling and floor by any convenient means such as screws.

Bin support members 96 are provided with means for supporting one edge of one or more bins 98. For example, in a preferred configuration pairs of support members 96 are connected by cross members 100 to form a ladder-like configuration. Bins 98 are then provided with a laterally extending flange 102 and a rolled flange 104 on opposite sides 106 and 108 respectively of bins 98. Each bin 98 is then held in position in the van by having the flange 102 inserted into a groove 32 and the flange 104 hooked over a cross member 100. The bins can thus be very readily removed as required for refilling or to be taken to a job site.

Figure 14:
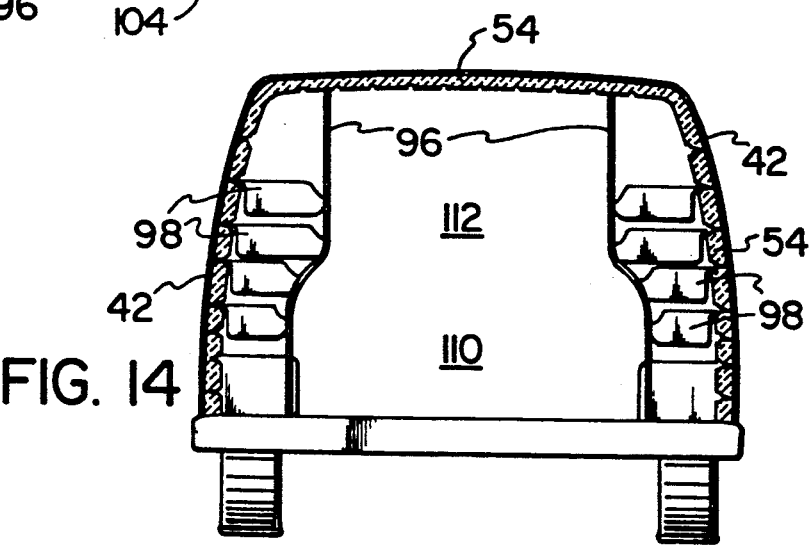
FIG. 14 is a view showing bin support members and insulation.

Obviously various sizes of bins can be utilized as illustrated in FIG. 14.

As also illustrated most clearly in FIG. 14, the bin support members 96 are preferably of a configuration which allows for a wider open cargo area in the bottom of the van as illustrated at 110 with a narrower cargo area but larger bins in the area 112. Thus, wider materials such as various kinds of sheets or panels can easily be carried in the van without interference.

Thus it is apparent that there has been provided in accordance with the invention a liner for a van or the like vehicle that fully satisfies the objects, aims and advantages set forth above. While the invention has been described in conjunction with specific embodiments thereof, it is evident that many alternatives, mofidications and variations will be apparent to those skilled in the art in light of the foregoing description. Accordingly, it is intended to embrace all such alternatives, modifications and variations as fall within the spirit and broad scope of the invention.

What I claim as my invention:

1. A liner for a van or the like vehicle, said liner comprising at least one panel member, said panel member comprising a face sheet having a series of grooves therein, each said groove being oriented substantially horizontally when said liner is installed in said vehicle, and each said groove having at least one area of discontinuity or of reduced depth therein, said at least one area of discontinuity aligned with a similar area in each groove of said series to provide a line of said areas to receive to a stud located behind, said panel member for securing said panel member to said stud.

2. The liner of claim 1 wherein said series of grooves are, when said liner is installed, vertically spaced.

3. The liner of claim 1 wherein said grooves are tapered.

4. The liner of claim 1 wherein said liner is constructed of molded plastic.

5. The liner of claim 1 wherein said panel member comprises, in addition, at least one predetermined pattern of grooves defining at least one window blank.

6. The liner of claim 1 comprising a group of said panel members formed to substantially cover at least the sides of a cargo area of said van or like vehicle.

7. The liner of claim 6 comprising, in addition, panel members to substantially cover rear doors of said van or the like vehicle.

8. A liner and storage kit for a van or like vehicle, said kit comprising a liner comprising at least one panel member, said panel member comprising a face sheet having a series of grooves therein each said groove being oriented substantially horizontally when said liner is installed in said vehicle, and, each said groove having at least one area of discontinuity or of reduced depth therein, said at least one area of discontinuity aligned with a similar area in each groove of said series to provide a line of said areas to receive a stud located behind said panel member for securing said panel member to said stud; and at least one bin support member for mounting in said van or like vehicle in a position spaced toward the interior of said van or like vehicle from said at least one panel member, said support member including means for supporting an outer side of a bin positioned between said support member and said panel member, the inner side of said bin supported by one of said grooves.

9. The kit of claim 8 wherein said at least one support member has an at least partly curved configuration such that, when installed, a lower part of said support member is closer to a side wall of said van or like vehicle and an upper part is farther from said side wall.

10. The kit of claim 9 wherein said upper and lower parts are straight and are joined by a curved section.

11. The kit of claim 8 comprising at least two said support members and wherein said means for supporting an outer side of a bin comprises at least one bin hanger for securing between said two support members.

12. The kit of claim 11 wherein said at least one bin hanger comprises a rod or tubular member for horizontal installation.

13. The kit of claim 8 comprising a group of said panel members formed to substantially cover at least the sides of a cargo area of said van or like vehicle.

14. The kit of claim 13 comprising, in addition, panel members to substantially cover rear doors of said van or like vehicle.

15. The kit of claim 14 comprising a series of said support members and, for securing in vertically spaced positions between each two said support members, a series of said bin hangers.

16. The kit of claim 8 mounted in a van and comprising said panel members to substantially cover side walls and rear doors of a cargo area of said van; further comprising a series of said bin support members and a series of said bin hangers, said hangers secured between adjacent ones of said support members in vertically spaced relation; and a series of bins having one edge supported within a said groove and an opposite edge supported on a said bin hanger.

17. The liner of claim 1 comprising, in addition, at least one roof panel for securing inside a roof section of said van or like vehicle.

18. The liner of claim 17 comprising a series of said roof panels and wherein said roof panels include a series of grooves therein and, along a first edge, a series of spaced hooked tabs for hooking over reinforcing studs of said vehicle roof section and along an opposite edge, a series of outwardly extending tabs for interfitting between said hooked tabs of an adjacent roof panel.

* * * * *